United States Patent
Dray et al.

[15] 3,650,652
[45] Mar. 21, 1972

[54] APPARATUS FOR EXTRUDING PLASTIC MATERIAL

[72] Inventors: Robert F. Dray, New Castle, Pa.; Donald L. Lawrence, Toledo, Ohio

[73] Assignees: Feed Screws, Inc., New Castle, Pa. by said Robert F. Dray; Owens-Illinois, Inc., Toledo, Ohio, by said Donald L. Lawrence

[22] Filed: May 5, 1970

[21] Appl. No.: 34,726

[52] U.S. Cl. ........................... 425/206, 425/208, 425/376
[51] Int. Cl. ........................................................ B29f 3/02
[58] Field of Search .................................. 18/12 SM, 30 SM

[56] References Cited

UNITED STATES PATENTS

| | | | |
|---|---|---|---|
| 2,343,529 | 3/1944 | Bronn | 18/12 SM |
| 3,110,060 | 11/1963 | Rengert | 18/12 SM UX |
| 3,271,819 | 9/1966 | Lacher | 18/12 SM |
| 3,368,724 | 2/1968 | Peters et al. | 18/12 SM UX |
| 3,375,549 | 4/1968 | Geyer | 18/12 SM |
| 3,445,890 | 5/1969 | Heston | 18/12 SM |

FOREIGN PATENTS OR APPLICATIONS

| | | | |
|---|---|---|---|
| 44-4576 | 1969 | Japan | 18/12 SM |
| 420,581 | 3/1967 | Switzerland | 18/12 SM |

*Primary Examiner*—J. Spencer Overholser
*Assistant Examiner*—Michael O. Sutton
*Attorney*—Philip M. Rice and E. J. Holler

[57] ABSTRACT

Extruding plastic material utilizing an extruder comprising a cylindrical bore having an inlet at one end and an outlet at the other end in which a single shaft screw is rotatably mounted. The periphery of the screw is formed with a first land that defines a main helical channel that extends throughout the length of the screw. At a point downstream from the inlet, the lead of the first land is increased and a second land begins defining with the first land an auxiliary helical channel. The periphery of the second land is spaced from the surface of the bore a greater distance than the periphery of the first land and the second land terminates at a point spaced rearwardly from the end of the first land and in spaced relation thereto.

19 Claims, 6 Drawing Figures

Patented March 21, 1972
3,650,652
2 Sheets-Sheet 1
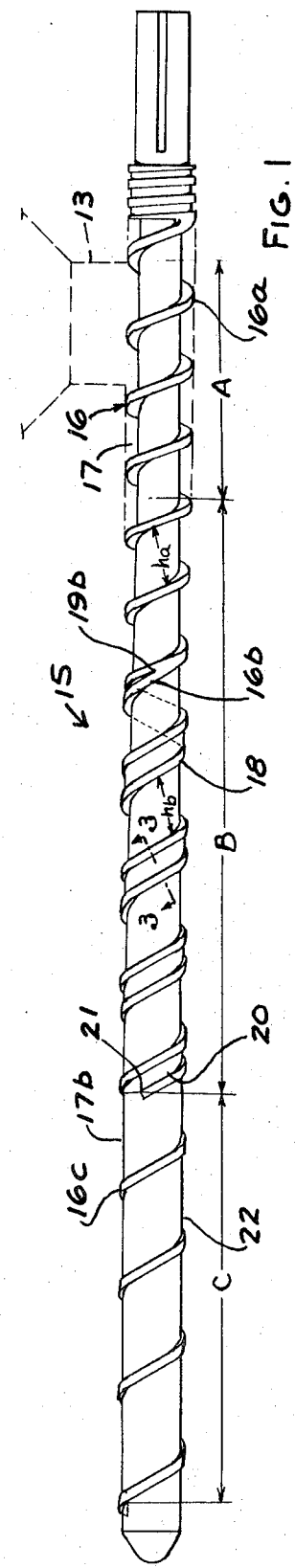
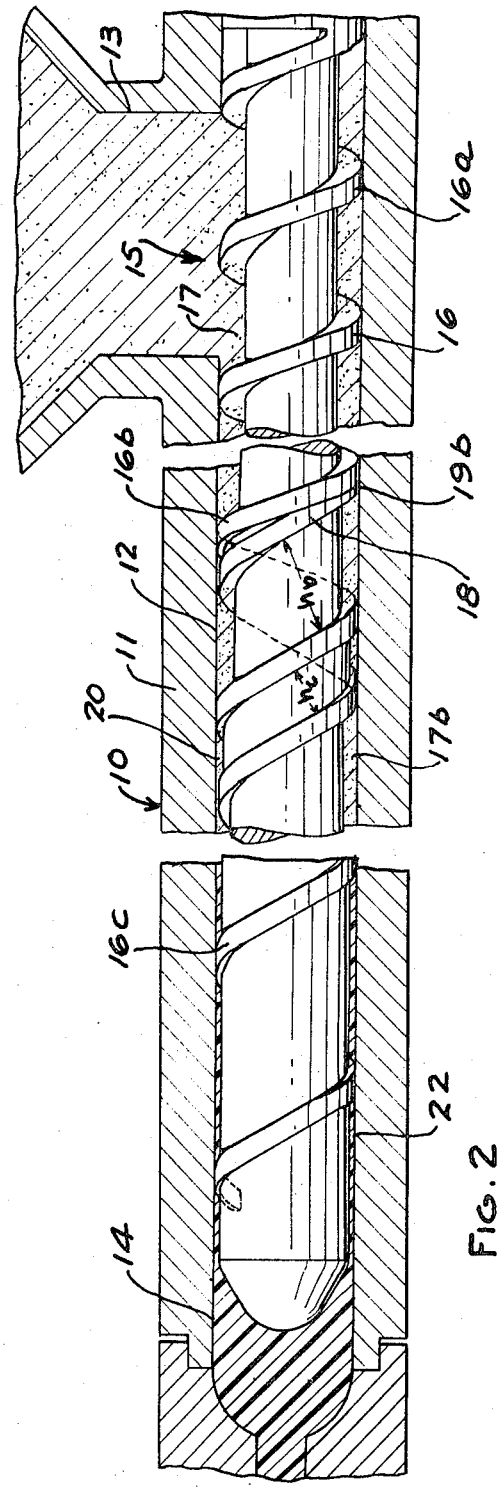
INVENTORS
ROBERT F. DRAY
DONALD L. LAWRENCE Patented March 21, 1972

INVENTORS
ROBERT F. DRAY
DONALD L. LAWRENCE

APPARATUS FOR EXTRUDING PLASTIC MATERIAL

This invention relates to extruding plastic materials.

BACKGROUND OF THE INVENTION

In the prior art extrusion of plastic materials in a single stage square pitch screw extruder, the extrusion is achieved by providing varying depths of feed and metering sections and various lengths of such sections in accordance with the types of materials being extruded. For example, for higher rates, the metering sections are usually increased in depth. However, as the rates of extrusion are increased, very often it is necessary to sacrifice the quality of the extrudate. In order to overcome this, longer sections have been tried but these have resulted in higher temperatures.

Various devices have been suggested in the art but they have resulted in the need for increased horsepower and, often, instability as to certain type of materials. For example, in one type of device that has been suggested, the screw is provided with a first land that defines a first channel and a second land that defines a second channel. The first channel defined by the first land terminates downstream of the inlet so that the pressure in the first channel progressively increases to force all of the plastic material from the first channel into the second channel and thereafter delivered to the metering section. Such an extruder screw is shown in the U.S. Pat. No. 3,375,549 to Geyer. In such an extruder screw, the plastic is refined and worked while passing through the narrow aperture from the first channel into the second channel.

Among the objects of the invention are to provide a method and an extruder which utilize a single screw whereby plastic materials may be effectively and efficiently extruded without substantially increasing the horsepower required and without sacrificing the quality of the extrudate; wherein plastic materials that have not been heretofore effectively handled by a single screw may be efficiently extruded.

SUMMARY OF THE INVENTION

According to the invention, the plastic material is moved in a main helical path until a portion of the material becomes molten. At that point, the lead or pitch of the helical path is increased and an auxiliary helical path is provided to permit the molten plastic to move freely into the auxiliary path. Continued movement of the plastic material in the main helical path causes further melting and finally the plastic is returned from the auxiliary helical path into the main path where it is mixed with the plastic in the main helical path and delivered to the outlet. The extruder embodying the invention comprises a cylindrical bore having an inlet at one end and an outlet at the other end in which a single shaft screw is rotatably mounted. The periphery of the screw is formed with a first land that defines a main helical channel that extends throughout the length of the screw. At a point downstream from the inlet, the lead of the first land is increased and a second land begins defining with the first land an auxiliary helical channel. The periphery of the second land is spaced from the surface of the bore a greater distance than the periphery of the first land and the second land terminates at a point spaced rearwardly from the end of the first land.

DESCRIPTION OF THE DRAWINGS

FIG. 1 is a longitudinal side view of an extruder screw embodying the invention.

FIG. 2 is a fragmentary longitudinal sectional view on an enlarged scale.

DESCRIPTION

Figure 4:
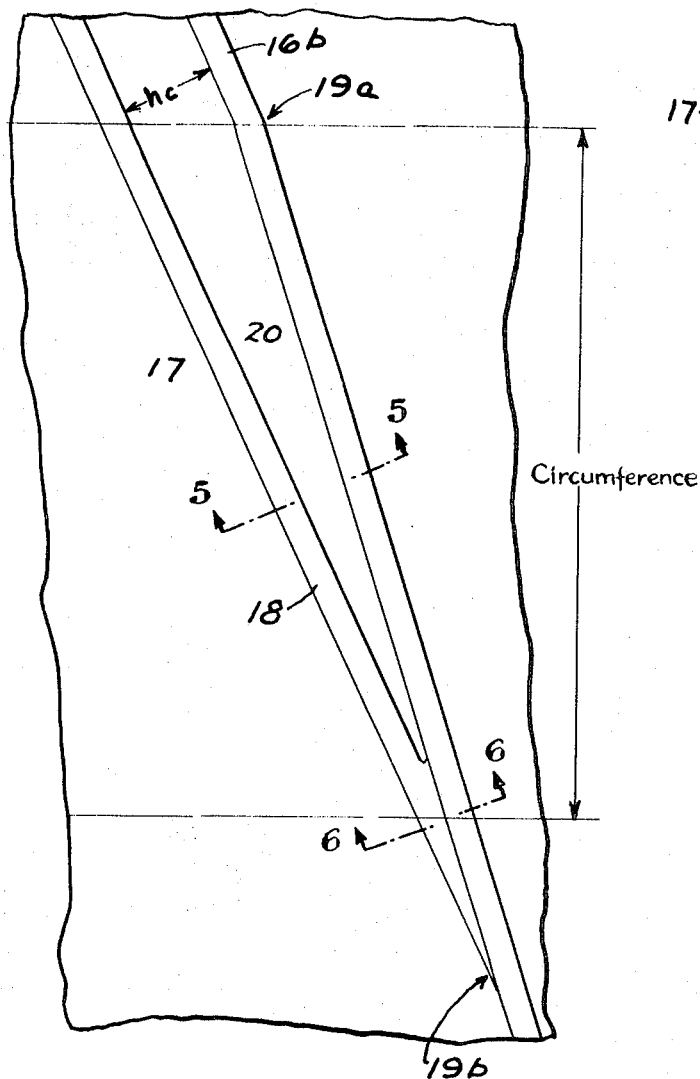
FIG. 4 is a developed view of the screw shown in FIGS. 1 and 2 at one point along its length.
Figure 3:
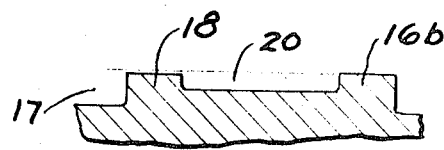
FIG. 3 is a fragmentary sectional view taken along the line 3—3 in FIG. 1.
Figure 5:
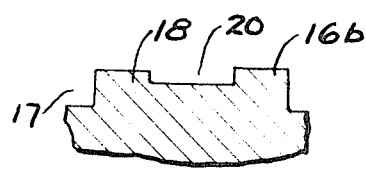
FIG. 5 is a fragmentary sectional view taken along the line 5—5 in FIG. 4.
Figure 6:
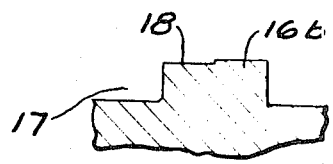
FIG. 6 is a fragmentary sectional view taken along the line 6—6 in FIG. 4.

Referring to the drawings, the extruder 10 embodying the invention comprises a body 11 having a heated cylindrical bore 12 therein including an inlet 13 at one end through which material to be extruded is delivered and an outlet 14 at the other end through which the molten material is discharged.

An extruder screw 15 is rotatably mounted within the cylindrical bore for rotation by suitable power mechanism (not shown). Extruder screw 15 includes a first helical land 16 that extends throughout the length of the screw. Helical land 16 defines a main channel that extends along the entire length of the screw. The main channel 17 may be divided into three zones, a feeding zone A wherein the solids are conveyed efficiently from the inlet 13 to the remainder of the screw at an optimum rate, a melting or intermediate zone B in which the plastic material is melted, and a metering zone C in which the molten plastic is uniformly mixed and delivered to the outlet 14 at the proper pressure and rate.

The length, depth and pitch of the portions 16a of helical land 16 in the feed section A are such that optimum conveying of the solids occurs in the feeding section A.

At a point 19a in the melting section B (FIG. 4) where a portion of the plastic has melted, the portion 16b of helical land 16 increases in pitch to speed up the movement of the plastic (FIG. 4). At a point 19b slightly upstream from this point a second land 18 (FIG. 4) begins from the first land and diverges to define an auxiliary channel 20 with the first land 16b.

The depth of channel 17 just prior to the point 19b is substantially equal to the depth of the channel 17 downstream or beyond the point 19b and the helical width $h_a$ of the channel (FIG. 1) upstream of point 19b is equal to or less than the helical width $h_b$ of the channel 17 downstream from the point 19b such that there is no constriction or restriction to flow of the plastic material from the portion of the channel 17 upstream of point 19b to the portion of the channel 17 downstream from the point 19b. The periphery of the land 18 is spaced from the surface of the bore 12 a distance greater than the periphery of the land 16, which has a constant diameter throughout. As a result, the plastic material in the intermediate section B is increased in speed and any molten plastic in the channel 17 downstream from the point 19b begins to flow freely over the periphery of the land 18 into the channel 20.

The depth of the channel 17 in the intermediate section B decreases progressively toward the end of the section B. The helical width $h_c$ of the channel 20 and depth of the channel 20 preferably remain constant such that the cross sectional area of the channel 20 is at least as great at the end of the channel 20 as at the beginning of the channel 20. The land 18 terminates in spaced relationship to the land 16b as at 21 so that at the end of the intermediate section B, the molten material in the auxiliary channel 20 flows freely into the portion 17b of the main channel 17.

In the metering section C, the lead of the main or first land 16c preferably remains constant. The depth of the main channel 17b, auxiliary channel 20 and the metering channel 22 are substantially equal at the area where the metering section begins and the auxiliary channel 20 ends.

In operation, as the screw is rotated, the plastic material is fed from the inlet through the feed section A at an optimum rate. As the material enters the intermediate section B, it is subjected to shearing action against the bore 12 which together with the heat in the body 11 begin to melt the plastic material. The molten material occurs at the interface between the solid plastic material and the bore 12 and toward the rear of the channel 17 adjacent the land 16. By the time the plastic material has reached the area of the auxiliary channel 20, a portion of the plastic is molten. At this point, since the lead or pitch of the land 16 increases without any increase in the cross sectional area of the main channel 17 at that point, the plastic is moved at a more rapid rate and any pressure that has occurred on the plastic in main channel 17 is substantially relieved. Thus the molten plastic in main channel 17 is permitted to pass relatively freely into the empty leading end of the auxiliary channel 20. This occurs without any restriction on the plastic in the main channel 17. Since the molten plastic moves freely into the auxiliary channel 20, additional volumetric area is provided in main channel 17 for the plastic material which is being delivered by the feed section.

Continued rotation of the screw will produce further melting in the main channel 17 and any molten plastic will pass progressively freely into the auxiliary channel 20 until the auxiliary channel 20 is full at a point downstream from the beginning 19b of the land 18. After the auxiliary channel 20 is full at a downstream point, no further plastic material will flow over the land 18 into the auxiliary channel 20 and continued rotation of the screw will force the plastic in the main channel portions 17b to be sheared against the surface 12 of the bore and be melted. Since the width of the main channel 17 in the intermediate section B is not less than at the beginning of the intermediate section B, the area of the solid plastic subjected to shearing contact with the bore 12 is not reduced at any point in the intermediate section B.

By the time the plastic has reached the end of the portion 17b of the main channel 17, the auxiliary channel 20 ends permitting the plastic in the auxiliary channel 20 to flow freely into the molten plastic in the main channel 17 and pass together in the metering section.

The metering section is quite shallow and long, having a greater pitch than the intermediate section so that a greater area of plastic is exposed to the surface of the bore.

It has been found that in this manner effective and efficient extrusion of plastic material is achieved without increasing the horsepower and without sacrificing the quality of the extrudate.

A typical example of the dimensions of the extruder for extruding high density polyethylene is as follows:

| | |
|---|---|
| Length of screw | 60 in. |
| Diameter of bore | 3 in. |
| Helical width of main channel | 2-5/8 in. |
| Helical width of auxiliary channel | 1-1/8 in. |
| Depth of auxiliary channel | 0.120 |
| Depth of main channel at beginning of intermediate section B | 0.480 |
| Depth of main channel at end of intermediate section B | 0.120 |
| Depth of metering section | 0.120 |
| Clearance between land 16 and bore | 0.006 |
| Clearance between land 17 and bore | 0.036 |
| Length of feed section | 12 in. |
| Length of intermediate section | 34-1/2 in. |
| Length of intermediate section to point 19b | 6 in. |
| Length of metering section | 13-1/2 in. |
| Lead of metering section | 4-1/2 in. |
| Length of auxiliary channel | 28-1/2 in. |
| Width of land 16 | 3/8 in. |
| Width of land 18 | 3/16 in. |

When the above extruder was compared with a conventional 3 inch, 60 inch long extruder having four turns of feed, an intermediate section ranging in depth from 0.480 inches to 0.140 inches, and a metering section having a depth of 0.140 inches and 5 turns, it was found that the extruder embodying the invention had 27 percent more capacity than the prior single screw extruder with the same horsepower input.

We claim:

1. An extruder comprising
  a body having a bore,
  a shaft,
  said body having an inlet and an outlet adjacent opposite ends of said bore,
  means for rotatably supporting said shaft in said bore,
  first helical land means on said shaft extending along its length and defining a main channel for forcing plastic from the inlet toward the other end of the bore upon rotation of the shaft,
  the lead of said first helical land means increasing at a point downstream from the inlet without change in the transverse cross sectional area of said main channel,
  second helical land means on said shaft beginning substantially at said point and extending and cooperating with said first helical land means to define an auxiliary channel,
  said second helical land means having its periphery spaced from the bore a distance greater than said first helical land means at said point such that any molten material in said main channel at said point is permitted to flow freely to said auxiliary channel,
  said second helical land means terminating in spaced relation to the end of said first helical land means nearest the outlet and having the end thereof in spaced relation to said first helical means, whereby the molten plastic material from said auxiliary channel moves freely back into said main channel and is mixed therewith and moved toward the outlet.

2. The combination set forth in claim 1 wherein the depth of said main channel decreases in a direction from the beginning toward said point where said auxiliary channel ends.

3. The combination set forth in claim 1 wherein said main and auxiliary channels have substantially the same depth at said point where said auxiliary channel ends.

4. The combination set forth in claim 1 wherein said main channel is of substantially the same helical width at least until the point where said auxiliary channel ends.

5. The combination set forth in claim 1 wherein said main channel is of constant helical width beyond the end of said auxiliary channel.

6. The combination set forth in claim 1 wherein the helical width of said main channel downstream from said point of increasing lead to the end of said auxiliary channel is at least as great as the helical width of said main channel at the beginning of said increasing lead.

7. The combination set forth in claim 1 wherein the helical width of said portion of said main channel beyond the end of said auxiliary channel is at least as great as the sum of the helical width of the main channel upstream therefrom and of said auxiliary channel upstream therefrom.

8. The combination set forth in claim 1 wherein the helical width of said main channel is substantially constant at least until the end of said auxiliary channel.

9. The combination set forth in claim 1 wherein the depth of said main channel decreases uniformly from the point where the auxiliary channel begins to the point where said auxiliary channel ends.

10. The combination set forth in claim 1 wherein the helical width of said auxiliary channel is constant.

11. The combination set forth in claim 10 wherein the depth of said auxiliary channel is constant.

12. The combination set forth in claim 1 wherein the depth of said main channel at a point beyond which said auxiliary channel ends is substantially constant.

13. An extruder comprising
  a body having a bore,
  a shaft
  said body having an inlet and an outlet adjacent opposite ends of said bore,
  means for rotatably supporting said shaft in said bore,
  a first helical land on said shaft extending along its length and defining a main channel for forcing plastic from the inlet toward the other end of the bore upon rotation of the shaft,
  the lead of said first helical land increasing at a point downstream from the inlet without change in the transverse cross sectional area of said main channel,
  a second helical land on said shaft beginning substantially at said point and extending and cooperating with said first helical land to define an auxiliary channel,
  said second helical land having its periphery spaced from the bore a distance greater than said first helical land such that any molten material in said main channel at said point is permitted to flow freely to said auxiliary channel,
  the depth of said main channel decreasing progressively from the point of beginning of said auxiliary channel where said auxiliary channel ends, said main channel having substantially the same helical width throughout at least until the point where said auxiliary channel ends, the helical width and depth of said auxiliary channel being constant, said second helical land terminating in spaced relation to the end of said first helical land nearest the outlet and having the end thereof in spaced relation to said first helical land, whereby the molten plastic material from said auxiliary channel moves freely back into said main channel and is mixed therewith and moved toward the outlet.

14. The combination set forth in claim 13 wherein said main and auxiliary channels are of the same depth at said point where said auxiliary channel ends.

15. The combination set forth in claim 14 wherein said main channel is of constant width beyond the end of said auxiliary channel.

16. The combination set forth in claim 13 wherein the helical width of said portion of said main channel beyond the end of said auxiliary channel is at least as great as the sum of the helical width of the main channel upstream therefrom and of said auxiliary channel upstream therefrom.

17. The combination set forth in claim 13 wherein the depth of said main channel at a point beyond which said auxiliary channel ends is substantially constant.

18. An extruder comprising
a body having a bore,
a shaft
said body having an inlet and an outlet adjacent opposite ends of said bore,
means for rotatably supporting said shaft in said bore,
a first helical land on said shaft extending along its length and defining a main channel for forcing plastic from the inlet toward the other end of the bore upon rotation of the shaft,
the portion of said land adjacent said inlet defining a feed section,
the portion of said land adjacent said outlet defining a metering section,
the depth of said main channel decreasing progressively in the intermediate section toward said metering section,
the lead of said first helical land increasing at a point downstream from the feed section without change in the transverse cross sectional area of said main channel,
a second helical land on said shaft in said intermediate section beginning substantially at said point and extending and cooperating with said first helical means to define an auxiliary channel,
said second helical land having its periphery spaced from the bore a distance greater than said first helical means such that any molten material in said main channel at said point is permitted to flow freely from said auxiliary channel,
the depth of said main channel decreasing progressively throughout said intermediate section,
said main channel having substantially the same helical width throughout said intermediate section,
the helical width and depth of said main channel in said intermediate section being at least as great as the helical width and depth of said main channel in said feed section at a point immediately in advance of said point of increasing pitch,
the helical width and depth of said auxiliary channel being substantially constant,
said main and auxiliary channels having the same depth at said point where said auxiliary channel ends,
the helical width of said portion of said main channel beyond the end of said auxiliary channel is at least as great as the sum of the helical widths of the main channel upstream therefrom and of said auxiliary channel upstream therefrom,
said helical land terminating in spaced relation to said metering section and having the end thereof in spaced relation to said first helical land, whereby the molten plastic material from said auxiliary channel moves freely back into said main channel and is mixed therewith and moved toward the outlet.

19. The combination set forth in claim 18 wherein the depth of said main channel in said metering section is substantially constant.

* * * * *